March 22, 1932. A. DINA 1,850,830
FILM SPROCKET
Filed Sept. 30, 1927
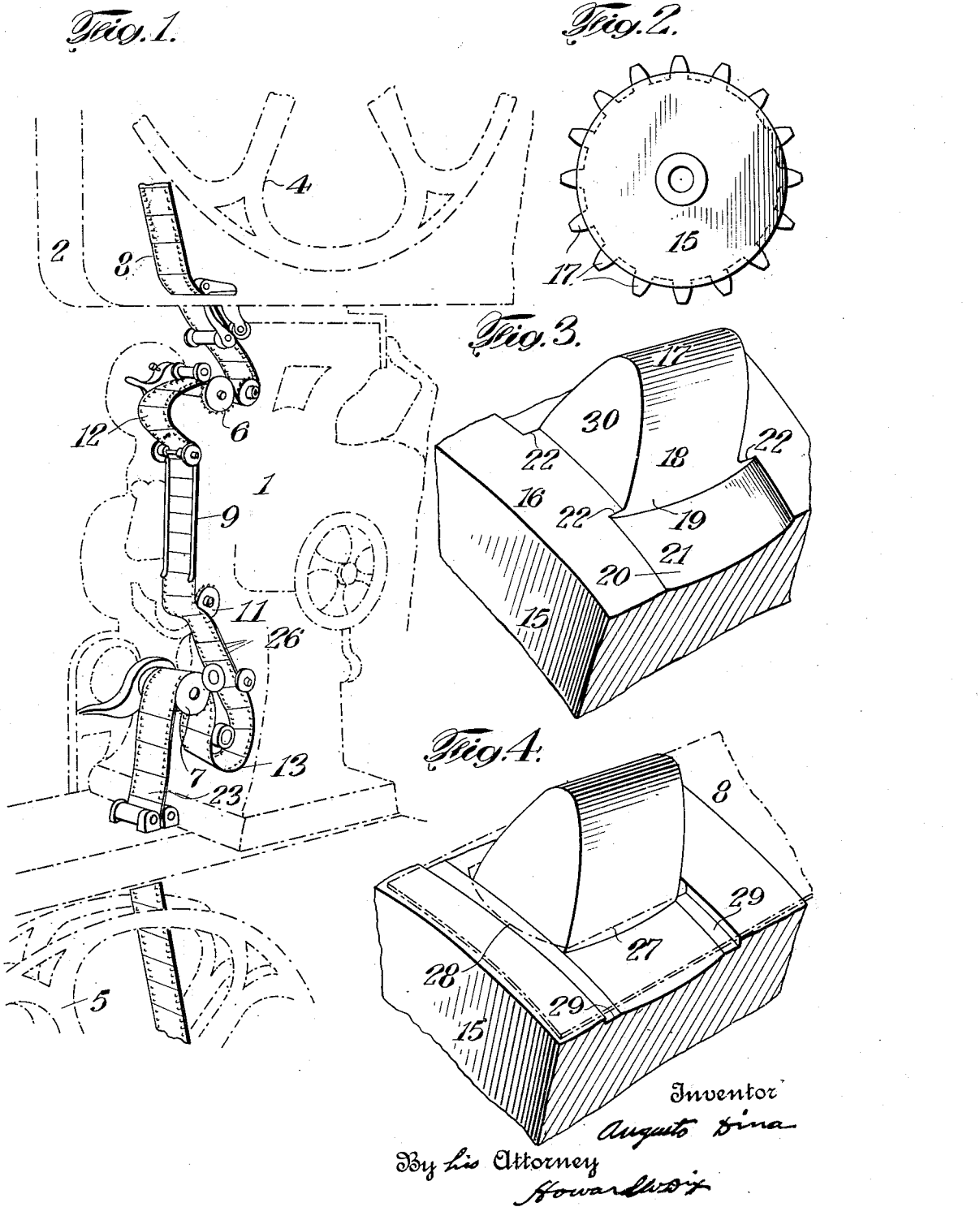
Inventor
Augusto Dina
By his Attorney
Howard Wix Patented Mar. 22, 1932

1,850,830

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FILM SPROCKET

Application filed September 30, 1927. Serial No. 222,973.

The invention relates in general to sprockets, and more particularly to sprockets for moving the film through a motion picture machine.

In motion picture machines it is usual practice to move the film through the machine by a number of sprockets appropriately spaced. The teeth of these sprockets are generally arranged in pairs for engaging the sprocket holes cut in each edge of the film. The films, which are usually made of celluloid, have but small resistance to disrupting stresses. In places where the pull is great it is of the utmost importance to have a sprocket which will exert the necessary pull on the film without damaging it or prematurely wearing or tearing it in any way. This requirement is particularly necessary with the intermittent sprocket which jerks the film past the aperture in the projection head, a picture at a time.

According to the invention herein, a sprocket is provided which will meet the above requirement simply and inexpensively and which has additional advantages which are pointed out hereinafter more in detail. According to the invention, the sprocket may comprise a cylindrical supporting drum having, preferably, integral teeth usually formed by milling out the material at intervals around the circumference of the drum. It has been found that the recesses formed between the teeth by the milling cutters extend below the surface of the drum and extend beyond the width of the teeth thereby forming sharp edges extending from the sides of the teeth. These sharp edges are very detrimental for they cut and damage the passing film. This is especially true where the film has contact with the sprocket through a substantial arc thereof in which case there is exerted on the film a component of force drawing it tight against the drum. According to the invention, these edges are eliminated usually by cutting them away, and preferably by cutting relatively small annular grooves at the sides of the teeth.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a perspective showing parts of a well-known type of motion picture machine;

Fig. 2 is a side elevation of a sprocket made according to the invention;

Fig. 3 is a perspective showing a detail of a sprocket illustrating the cutting edges which are eliminated by the invention; and Fig. 4 is a perspective showing a detail of lieved to be characteristic of this invention and having the undesirable sharp cutting edges removed.

In the following description and in the claims, parts will be identified by specific names for convenience, but they are intended to be as generic in their application to similar parts as the art will permit.

Like reference characters denote like parts in the several figures of the drawings.

Referring now to the drawings and more particularly to Fig. 1, the motion picture machine shown, for purposes of illustration, comprises a projection head 1 above which is located the upper film magazine 2 and below which is located the lower film magazine. The upper film magazine is provided with a suitable reel 4 and the lower film magazine is also provided with a suitable reel 5. The projection head 1 is provided with an upper continuously rotating sprocket 6 and a lower continuously rotating sprocket 7 suitably synchronized. These sprockets are rotated by suitable gearing and operate to aid the film 8 to unwind from the upper reel and to pass to the lower reel at a uniform rate.

The film 8 passes between suitable guiding devices 9 at the point where it passes the aperture in the aperture plate through which the light beam passes. Below the aperture an intermittent sprocket 11 is provided, rotating intermittently for drawing the film past the aperture, a picture at a time, as is well understood in the art. An upper loop 12 and a lower loop 13 are provided to take care of the difference in motion caused by the continuous sprockets 6 and 7 and the intermittent sprocket 11.

Referring now to the remaining figures, the construction of a sprocket according to the invention will now be described. This sprocket may be used at any of the places in a motion picture machine where sprockets are necessary or desirable, either as a continuous or intermittent sprocket. Obviously, its use is not limited to a motion picture machine but the sprocket may be used anywhere that its features of construction can be used to advantage.

The sprocket denoted by 15 comprises a cylindrical drum 16 suitably mounted for rotation upon a supporting shaft. The drum is provided with a plurality of integral sprocket teeth 17 preferably of rectangular cross section. The teeth taper outwardly both axially of the sprocket and circumferentially. The teeth are practically always formed by suitable machining operations, and the material between the teeth is usually removed by a suitable milling cutter. The milling cutter forms the axial surfaces 18 of the teeth and also the shallow recesses 21 between the teeth, these recesses extending below the cylindrical surface of the drum by reason of the conformation or circumference of the milling cutter.

In order to insure the proper shape of the teeth at the base thereof, the recesses 21 are made by the milling cutter extending below the cylindrical surface of the drum. The recesses 21 have curved bottoms 20 which extend axially, and have side walls 19 which are co-extensive with the side walls 18 of the teeth. The intersection of the side walls 19 of the recesses and the cylindrical surface of the drum form axial cutting edges 22 (Fig. 3) which would break and cut the film at the sprocket holes, were these edges allowed to remain.

The film 8 is of the usual construction comprising a series of pictures 23, each picture having a number of openings or sprocket holes 26 on its edge. Each hole 26 is practically always formed with straight lateral sides 27 for engaging the sprocket teeth, and curved longitudinal sides 28 as shown best in Fig. 4. The holes 26 are made larger than the base of the teeth with which they mesh so as to always insure an easy fit.

Due to the contact of the film around a substantial arc of the sprocket, it will be seen that the pull on the film necessary to move it causes it to draw toward the axis of the sprocket and to press tightly against the drum at the base of the teeth. If the cutting edges 22 are present, the pressure of the film against them will cause breaking or tearing of the film usually at the point where edges 27 and 28 join and it is then but a short time before the film is broken from hole to hole and the film must then be cut and the broken part removed. With the sprocket hole edges broken, it will be seen when the teeth act against edge 27 that the film will give somewhat before the film is moved by the intermittent sprocket and consequently the next film exposure or picture is not properly brought in alignment with the projecting aperture and the projection on the screen is therefore somewhat out of frame. After the sprocket holes have once been broken or torn, it is but a short time before the succeeding holes are broken and the film must then be cut, for if a series of the sprocket holes become broken from one to another, the intermittent sprocket cannot move the film and a fire immediately starts due to the heat of the projecting light on the film which the intermittent sprocket cannot move.

In order to eliminate the cutting edges 22 simply and inexpensively, two annular grooves 29 are provided, being located at the sides of the teeth as shown in Fig. 4. It will be seen that, as the film seats tightly against the drum in Fig. 4, there are no sharp cutting edges to injure it. The grooves 29 also serve to remove any small fillets which may be present between the circumferential tooth surfaces 30 and the cylindrical surface of the drum 16.

Thus it will be seen that the invention provides a sprocket inexpensive to manufacture, efficient in use and with no sharp edges to cut, injure, or tear the film. The objectionable edges are removed in a simple and efficient manner by the cutting of the annular grooves at the sides of the teeth. The use of the sprockets insures long life to the film with a minimum of wear and injury. It will be understood that the invention is not limited to a sprocket having integral teeth but is also applicable to other kinds of sprockets such as those of the built-up type where there are edges which would cut, tear or injure the film.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A sprocket comprising a drum having sprocket teeth, there being recesses between said teeth extending below the cylindrical surface of the drum, and an annular groove on each side of said teeth to eliminate the axial edges formed by the intersection of the cylindrical surface of said drum and the cutter recesses.

2. A sprocket comprising a drum having sprocket teeth, there being recesses between said teeth extending below the surface of the drum, the axial edges formed by the intersection of the drum and recess surfaces being eliminated.

3. A sprocket comprising a drum having integral sprocket teeth, there being shallow cutter recesses between said teeth extending below the cylindrical surface of the drum, said recesses having curved bottoms extending axially and sides co-extensive with the teeth surfaces, and an annular groove on each side of said teeth to eliminate the axial edges formed by the intersection of the cylindrical surface of said drum and the side surfaces of said cutter recesses.

4. A sprocket for use with a motion picture film having a row of openings, each opening having straight transverse sides and outwardly curved longitudinal sides said sprocket having a drum and sprocket teeth of rectangular section meshing said openings, each tooth tapering to its outer end both axially and circumferentially, there being recesses in the drum between said teeth, and annular grooves on both sides of said teeth to eliminate the sharp axial edges formed by the intersection of said recesses and the surface of said drum.

5. A sprocket for use with a motion picture film having a row of openings, said sprocket having a drum and sprocket teeth meshing said openings, each tooth tapering to its outer end, there being recesses in the drum between said teeth, and annular grooves in the surface of the drum on both sides of said teeth to eliminate the sharp edges formed by the intersection of said recesses and the surface of said drum.

6. A sprocket comprising a drum having sprocket teeth formed thereon, said drum having recesses formed in the surface thereof and entirely surrounding the base of each tooth whereby the edges normally formed by the intersection of the corners of the teeth and the surface of the drum are eliminated.

7. A sprocket comprising a drum having sprocket teeth formed thereon, said drum having recesses formed in the surface thereof at the corners of said teeth and so positioned that the corners of said teeth intersect said drum below the cylindrical surface thereof whereby the edges normally formed at the intersection of said corners and said surface are eliminated.

AUGUSTO DINA.